United States Patent
Chen et al.

(10) Patent No.: US 8,747,799 B2
(45) Date of Patent: Jun. 10, 2014

(54) METHOD OF FORMING SINGLE-WALLED CARBON NANOTUBES

(75) Inventors: Yuan Chen, Singapore (SG); Yanhui Yang, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 13/381,855

(22) PCT Filed: Jul. 5, 2010

(86) PCT No.: PCT/SG2010/000250
§ 371 (c)(1),
(2), (4) Date: Mar. 23, 2012

(87) PCT Pub. No.: WO2011/002417
PCT Pub. Date: Jan. 6, 2011

(65) Prior Publication Data
US 2012/0171107 A1    Jul. 5, 2012

Related U.S. Application Data

(60) Provisional application No. 61/222,940, filed on Jul. 3, 2009.

(51) Int. Cl.
*D01C 5/00* (2006.01)

(52) U.S. Cl.
USPC ............ 423/447.3; 423/447.1; 977/752; 977/751; 977/842

(58) Field of Classification Search
USPC ......... 423/447.1, 447.3; 977/842, 843, 742, 977/734, 751
See application file for complete search history.

(56) References Cited

U.S. PATENT DOCUMENTS

| 7,854,991 B2 | 12/2010 | Hata et al. |
| 2004/0265210 A1 | 12/2004 | Shinohara et al. |
| 2006/0083674 A1 | 4/2006 | Maruyama et al. |
| 2009/0291846 A1 | 11/2009 | Resasco et al. |

FOREIGN PATENT DOCUMENTS

| CN | 1699151 A | 11/2005 |
| CN | 1922347 A | 2/2007 |
| EP | 1787955 A1 | 5/2007 |
| JP | 2003-508333 A | 3/2003 |
| JP | 2007-527907 A | 10/2007 |
| JP | 2008-31024 A | 2/2008 |
| WO | WO-01/17901 A1 | 3/2001 |
| WO | WO-2004/071654 A1 | 8/2004 |

(Continued)

OTHER PUBLICATIONS

M.S. Hamdy, G. Mul, W. Wei, R. Anand, U. Hanefeld, J.C. Jansen, J.A. Moulijn, Fe, Co and Cu-incorporated TUD-1: Synthesis, characterization and catalytic performance in N2O decomposition and cyclohexane oxidation, Catalysis Today, vol. 110, Issues 3-4, Dec. 30, 2005, pp. 264-271, ISSN 0920-5861.*

(Continued)

*Primary Examiner* — Richard M Rump
(74) *Attorney, Agent, or Firm* — Alston & Bird LLP

(57) ABSTRACT

The present invention relates to a method of forming single-walled carbon nanotubes. The method comprises contacting a gaseous carbon source with mesoporous TUD-1 silicate at suitable conditions. The mesoporous TUD-1 silicate comprises a metal of groups 3-13 of the Periodic Table of the Elements.

14 Claims, 8 Drawing Sheets

(56) References Cited

FOREIGN PATENT DOCUMENTS

| WO | WO-2005/090324 A1 | 9/2005 |
|---|---|---|
| WO | WO 2006/004599 A2 | 1/2006 |
| WO | WO-2006/011655 A1 | 2/2006 |

OTHER PUBLICATIONS

Jorio, A.; Dresselhaus, G.; Dresselhaus, M. S.; Eds. *Carbon Nanotubes, Advanced Topics in the Synthesis, Structure, Properties and Applications*; Springer: Berlin, 2008. foreword, pp. V to IX.

Luo, Z. T.; Pfefferle, L. D.; Haller, G. L.; Papadimitrakopoulos, F. *J. Am. Chem. Soc.* 2006, 128, 15511.

Miyauchi, Y.; Chiashi, S.; Murakami, Y.; Hayashida, Y.; Murayama, S. *Chem. Phys. Lett.* 2004, 387, 198.

Lolli, G.; Zhang, L. A.; Balzano, L.; Sakulchaicharoen, N.; Tan, Y. Q.; Resasco, D. E. *Journal of Physical Chemistry B* 2006, 110, 2108.

Wang, B.; Li, L. J.; Yang, Y. H.; Chen, Y. *Journal of Materials Science* 2009, 44, 3285-3295.

Wang, B.; Poa, C. H. P.; Wei, L.; Li, L. J.; Yang, Y. H.; Chen, Y. *Journal of the American Chemical Society* 2007, 129, 9014.

Wang, B.; Wei, L.; Yao, L.; Li, L. J.; Yang, Y. H.; Chen, Y. *Journal of Physical Chemistry C* 2007, 111, 14612.

Ishigami, N.; Ago, H.; Imamoto, K.; Tsuji, M.; Iakoubovskii, K.; Minami, N. *Journal of the American Chemical Society* 2008, 130, 9918.

Bachilo, S. M.; Balzano, L.; Herrera, J. E.; Pompeo, F.; Resasco, D. E.; Weisman, R. B. *J. Am. Chem. Soc.* 2003, 125, 11186.

Maruyama, S.; Kojima, R.; Miyauchi, Y.; Chiashi, S.; Kohno, M. *Chemical Physics Letters* 2002, 360, 229.

Li, X.; Tu, X.; Zaric, S.; Welsher, K.; Seo, W. S.; Zhao, W.; Dai, H. *J. Am. Chem. Soc.* 2007, 129, 15770.

Lim, S.; Ciuparu, D.; Pak, C.; Dobek, F.; Chen, Y.; Harding, D.; Pfefferle, L.; Haller, G. *J. Phys. Chem. B* 2003, 107, 11048.

Ciuparu, D.; Chen, Y.; Lim, S.; Haller, G. L.; Pfefferle, L. *Journal of Physical Chemistry B* 2004, 108, 10196.

Ciuparu, D.; Chen, Y.; Lim, S.; Haller, G. L.; Pfefferle, L. *Journal of Physical Chemistry B* 2004, 108, 503.

Alvarez, W. E.; Kitiyanan, B.; Borgna, A.; Resasco, D. E. *Carbon* 2001, 39, 547.

Chen, Y.; Ciuparu, D.; Lim, S.; Haller, G. L.; Pfefferle, L. D. *Carbon* 2006, 44, 67.

Amama, P. B.; Lim, S.; Ciuparu, D.; Yang, Y.; Pfefferle, L.; Haller, G. L. *Journal of Physical Chemistry B* 2005, 109, 2645.

Yang, Y.; Lim, S.; Du, G.; Chen, Y.; Ciuparu, D.; Haller, G. L. *Journal of Physical Chemistry B* 2005, 109, 13237.

Chen, Y.; Ciuparu, D.; Yang, Y.; Lim, S.; Wang, C.; Haller, G. L.; Pfefferle, L. D. *Nanotechnology* 2005, 16, 476.

Yang, Y.; Lim, S.; Du, G.; Wang, C.; Ciuparu, D.; Chen, Y.; Haller, G. L. *Journal of Physical Chemistry B* 2006, 110, 5927.

Chen, Y.; Wang, B.; Li, L.-J.; Yang, Y.; Ciuparu, D.; Lim, S.; Haller, G. L.; Pfefferle, L. D. *Carbon* 2007, 45, 2217.

Chen, Y.; Wei, L.; Wang, B.; Lim, S.; Ciuparu, D.; Zheng, M.; Chen, J.; Zoican, .C.; Yang, Y.; Haller, G. L.; Pfefferle, L. D. *ACS Nano* 2007, 1, 327.

Jansen, J. C.; Shan, Z.; Maschmeyer, T.; Marchese, L.; Zhou, W.; Puil, N. v. d. *Chemical Communications* 2001, 713.

Hamdy, M. S.; Mul, G.; Jansen, J. C.; Ebaid, A.; Shan, Z.; Overweg, A. R.; Maschmeyer, T. *Catalysis Today* 2005, 100, 255.

Shan, Z.; Jansen, J. C.; Zhou, W.; Maschmeyer, T. *Applied Catalysis A: General* 2003, 254, 339.

Shan, Z.; Jansen, J. C.; Marchese, L.; Maschmeyer, T. *Microporous and Mesoporous Materials* 2001, 48, 181.

Mohamed S. Hamdy, A. R. T. M. U. H. J. C. J. *Chemistry—A European Journal* 2006, 12, 1782.

Anand, R.; Hamdy, M. S.; Gkourgkoulas, P.; Maschmeyer, T.; Jansen, J. C.; Hanefeld, U. *Catalysis Today* 2006, 117, 279.

Brik, Y.; Kacimi, M.; Ziyad, M.; Bozon-Verduraz, F. *Journal of Catalysis* 2001, 202, 118.

Vo, M.; Borgmann, D.; Wedler, G. *Journal of Catalysis* 2002, 212, 10.

Wei, L.; Wang, B.; Wang, Q.; Li, L.-J.; Yang, Y.; Chen, Y. *Journal of Physical Chemistry C* 2008, 112, 17567.

Milnera, M.; Kürti, J.; Hulman, M.; Kuzmany, H. *Physical Review Letters* 2000, 84, 1324.

Weisman, R. B.; Bachilo, S. M. *Nano Lett.* 2003, 3, 1235.

Viscarra Rossel, R. A.; McBratney, A. B. *Geoderma* 1998, 85, 19.

Chen, Y.; Ciuparu, D.; Lim, S.; Yang, Y.; Haller, G. L.; Pfefferle, L. *Journal of Catalysis* 2004, 226, 351.

Chen, Y.; Ciuparu, D.; Lim, S. Y.; Yang, Y. H.; Haller, G. L.; Pfefferle, L. *Journal of Catalysis* 2004, 225, 453.

Lolli, G.; Zhang, L.; Balzano, L.; Sakulchaicharoen, N.; Tan, Y.; Resasco, D. E. *J. Phys. Chem. B* 2006, 110, 2108.

Herrera, J. E.; Balzano, L.; Borgna, A; Alvarez, W. E.; Resasco, D. E. *Journal of Catalysis* 2001, 204, 129.

Wei, L.; Wang, B.; Wang, Q.; Li, L.-J.; Yang, Y.; Chen, Y. *J. Phys. Chem. C.* 2008, 112, 17567-17575.

Wei, L.; Wang, B.; Goh, T. H.; Li, L.-J.; Yang, Y.; Chan-Park, M. B.; Chen, Y. *The Journal of Physical Chemistry B* 2008, 112, 2771.

Chen, F.; Wang, B.; Chen, Y.; Li, L. J. *Nano Lett.* 2007, 7, 3013.

Lim, S.; Li, N.; Fang, F.; Pinault, M.; Zoican, C.; Wang, C.; Fadel, T.; Pfefferle, L. D.; Haller, G. L. *J. Phys. Chem. C* 2008, 112, 12442.

Telalovi et al. *J. Mater. Chem.*, 2010, 20, 642-658.

Somanathan, T., et. al. Indian Journal of Pure and Applied Physics, vol. 44 (2006), pp. 173-176.

International Preliminary Report on Patentability and Written Opinion from International Application No. PCT/SG2010/000250, filed Jul. 5, 2010.

Deng, Z.; Terasaki, O., and Balkus, Jr., K.J.; "Carbon Nanotubes Synthesized in Zeolites UTD-1, UTD-18 and UTD-12"; *Studies in Surface Science and Catalysis*, vol. 154, 2004 Elsevier B.V.

Office Action for Chinese Application No. 201080036707.8 dated Jul. 30, 2013.

Chen, Y. et al., *Synthesis of Uniform Diameter Singal Wall Carbon Nanotubes in Co-MCM-41: Effects of CO Pressure and Reaction Time*, Journal of Catalysis, 226 (2004) 351-362.

Office Action from related Japanese Appl. No. 2012-519517, mailed Mar. 3, 2014.

* cited by examiner

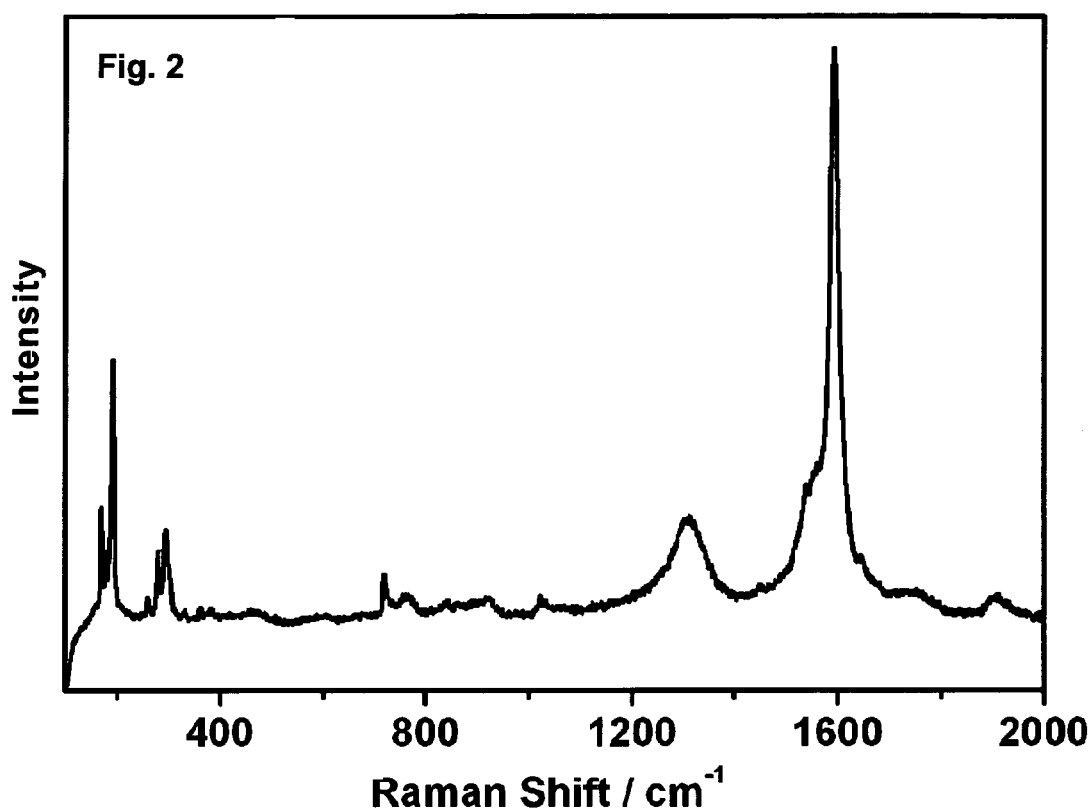
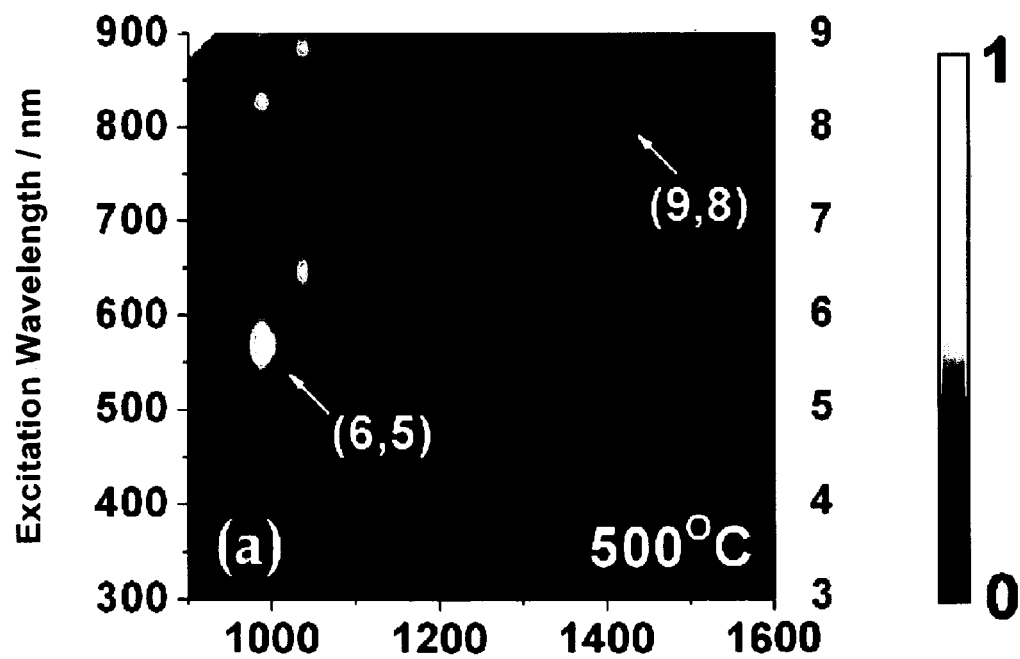
Fig. 3 (cont. on next page)

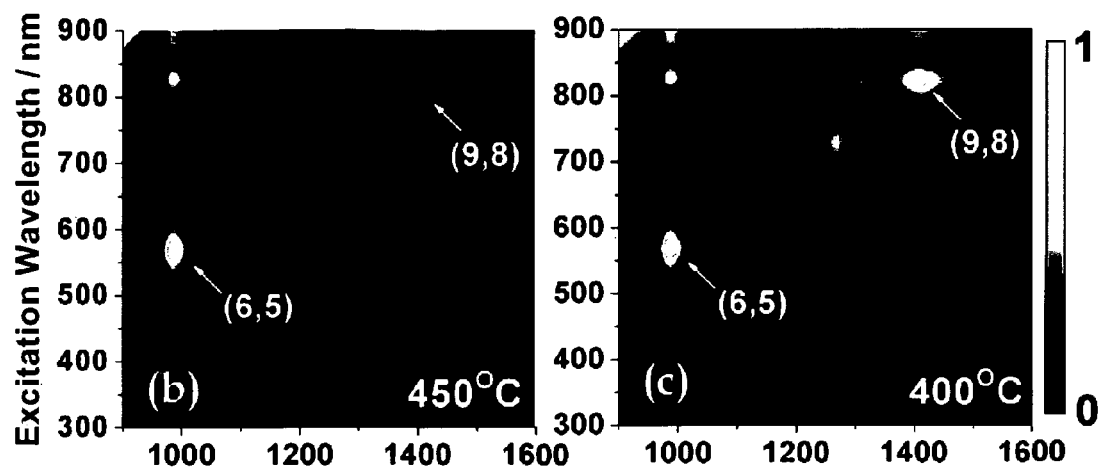
Fig. 3 (cont. from prev. page)
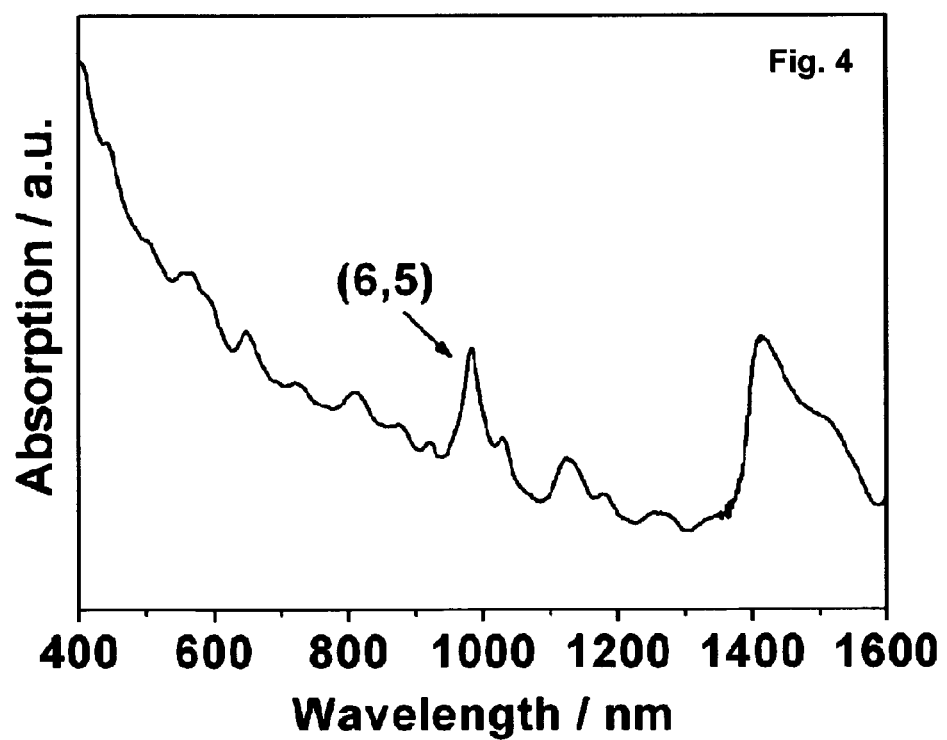
Fig. 4

METHOD OF FORMING SINGLE-WALLED CARBON NANOTUBES

CROSS-REFERENCE TO RELATED APPLICATIONS

This application makes reference to and claims the benefit of priority of an application for a "Metal Incorporated TUD-1 Catalyst for Carbon Nanotubes Synthesis" filed on Jul. 3, 2009 with the United States Patent and Trademark Office, and there duly assigned Ser. No. 61/222,940. The contents of said application filed on Jul. 3, 2009 is incorporated herein by reference for all purposes, including an incorporation of any element or part of the description, claims or drawings not contained herein and referred to in Rule 20.5(a) of the PCT, pursuant to Rule 4.18 of the PCT.

FIELD OF THE INVENTION

The present invention relates to a method of forming single-walled carbon nanotubes.

BACKGROUND OF THE INVENTION

Single-walled carbon nanotubes (SWCNTs) have a unique one dimensional structure with extraordinary thermal, mechanical, electro-optical and electronic properties making them promising candidates for various applications such as electronic devices, chemical sensors or hydrogen storage devices (see, for example, Jorio, A., Dresselhaus, G., Dresselhaus, M. S., Eds. Carbon Nanotubes, *Advanced Topics in the Synthesis, Structure, Properties and Applications*; Springer: Berlin, 2008; foreword, pages V to IX).

Electronic properties of SWNTs depend on their geometry, i.e. diameter and chirality. Each tube structure can be identified with a pair of integers (n,m), which illustrates how the graphene is rolled up to form the nanotube. These chiral indices (n,m) specify the perimeter of the carbon nanotube (chiral vector) on the graphene net. Thereby the integers (n,m) also determine diameter and helicity of a carbon nanotube. If m=0, the nanotube is called "zigzag". If n=m, the nanotube is called "armchair". Otherwise, the nanotube is called "chiral", since in such cases the chains of atoms spiral around the tube axis instead of closing around the circumference.

The optimal performance of SWCNTs in many potential applications relies on the (n,m) monodispersity of tube samples, because SWCNTs of different (n,m) structure have distinct properties. Most SWCNT synthesis methods result in tube samples with a wide (n,m) distribution. Studies have demonstrated that SWCNTs with narrow (n,m) distribution (less than 20 species) can be produced, and moreover, the (n,m) selectivity can be manipulated by optimizing growth conditions, such as temperature, catalyst support, carbon feedstock, gas pressure, and crystal plane. Further, as the SWNT diameter decreases, the number of possible selections (n,m) on the graphite sheet for forming SWNT decreases, so that the diversity of possible chiral conformations decreases. Accordingly, small diameter SWNTs with a narrow diameter distribution are highly desirable, since the respective SWNTs have more uniform electronic properties. Beyond all those growth conditions, catalysts play the most crucial role in determining the (n,m) distribution of SWCNTs produced. The development of new catalysts which can lead to large scale and economical production of SWCNTs with desired (n,m) structures is the premier target in SWCNT synthesis research.

Several catalysts have demonstrated good selectivity toward narrow (n,m) distribution SWCNTs, which include Co/Mo catalysts (Bachilo, S M, et al., J. Am. Chem. Soc. (2003) 125, 11186), Fe/Co catalysts (Maruyama, S, et al., Chemical Physics Letters (2002) 360, 229), Fe/Ru catalysts (Li, X., et al., J. Am. Chem. Soc. (2007) 129, 15770), and Co-MCM-41 catalysts (Lim, S, et al., L., J. Phys. Chem. B (2003) 107, 11048; Ciuparu, D, et al., Journal of Physical Chemistry B (2004) 108, 10196; Ciuparu, D, et al., Journal of Physical Chemistry B (2004) 108, 503). The first three catalysts are all bimetallic catalysts. Synergism effects between two metallic species help stabilizing metallic clusters, which enable narrow distributions of (n,m). An efficient catalyst for economical nanotube production also requires the simplicity of removing substrate and metallic clusters in the follow-up nanotube purification process. From this point of view, a mono-metallic catalyst is preferred to its bimetallic rivals, because Mo or Ru compounds are difficult to remove from nanotube samples. Ciuparu et al. (2004, page 10196, supra) successfully incorporated mono-metallic Co into a mesoporous molecular sieve (MCM-41), and use it as a catalyst for SWCNT growth (Ciuparu et al., 2004, page 10196, supra; Ciuparu et al., 2004, page 503, supra; Chen, Y, et at, Carbon (2006) 44, 67). Other metals such as Ni and Fe can be also incorporated into MCM-41 for SWCNT growth. The narrowest (n,m) distribution from a bulk SWCNT sample has been reported on tubes produced from a Co-MCM-41 catalyst. This catalyst also enables a mild, four-step purification method to obtain low-defect tubes. However, the drawbacks of Co-MCM-41 catalyst are their high cost (various expensive surfactants), long synthesis time (7 days in autoclave), and relative low carbon loading (1.25 wt. % carbon/1 wt. % cobalt), which significantly further increases the cost of SWCNTs. It is therefore desired to obtain a novel mono-metallic catalyst, which can retain a good selectivity toward narrowly (n,m) distributed SWCNTs, and that at the same time can be synthesized at a lower cost and in shorter time compared to Co-MCM-41. Ideally such a catalyst can produce SWCNTs with higher productivity.

It is therefore an object of the present invention to provide a method of producing single-walled carbon nanotubes that avoids the above described drawbacks or shortcomings of the current techniques.

SUMMARY OF THE INVENTION

The present invention relates to an activated catalyst capable of growing single-walled carbon nanotubes when contacted with a carbon source in chemical vapour deposition, and a method for forming such an activated catalyst is provided. The activated catalyst is or includes mesoporous TUD-1 silicate. The invention also relates to the production of carbon nanotubes and to carbon nanotubes obtained. TUD-1 is a mesoporous silica with large surface area (up to 1000 $m^2/g$) and high thermal stability (little degradation at 1000° C.) that was synthesised at the Technische Universiteit Delft and was first described by Jansen et al. in Chem. Commun., 2001, 713-71. It can be synthesized using small, inexpensive non-surfactant chemicals. Different methods have be developed to incorporate metallic ions (see, e.g. Fe: Hamdy, M S, et al., Catalysis Today (2005), 100, 255; Al: Shan, Z, et al., Applied Catalysis A: General (2003) 254, 339, Ti: Shan, Z, et al., Microporous and Mesoporous Materials (2001) 48, 181; and Co: Hamdy, M S, et al., Chemistry—A European Journal (2006) 12, 1782; Anand, R, et al., Catalysis Today (2006) 117, 279, or Telalovi et al. J. Mater. Chem., 2010, 20, 642-658) into TUD-1 silica structure. Up to the present invention, TUD-1 has not been known to be able to grow carbon nanotubes.

In a first aspect the present invention provides a method of forming single-walled carbon nanotubes. The method includes contacting a gaseous carbon source with a mesoporous TUD-1 silicate at suitable conditions. The mesoporous TUD-1 silicate includes a catalytically effective metal for nanotube growth.

In typical embodiments the method includes carrying out chemical vapour deposition. In carrying out chemical vapour deposition, a carbon source in fluid form or a carbon source that is included in a fluid such as a gaseous carbon source and mesoporous TUD-1 silicate are used.

In some embodiments the catalytically effective metal for nanotube growth is a metal of groups 3-13 of the Periodic Table of the Elements.

In a related aspect the invention relates to the use of mesoporous TUD-1 silicate in forming single-walled carbon nanotubes. The use includes contacting a gaseous carbon source with a mesoporous TUD-1 silicate at suitable conditions. The mesoporous TUD-1 silicate includes a catalytically effective metal for nanotube growth.

In some embodiments the catalytically effective metal for nanotube growth is a metal of groups 3-13 of the Periodic Table of the Elements.

In a further aspect the present invention relates to single-walled carbon nanotubes obtained by a method according to the first aspect.

According to one embodiment the majority of the single-walled carbon nanotubes formed has one of the chiral indices (6,5), (9,8), (7,6), (8,4) and (7,6).

Other aspects, features and embodiments of the invention will be more fully apparent from the following disclosure and appended claims.

BRIEF DESCRIPTION OF THE DRAWINGS

The invention will be better understood with reference to the detailed description when considered in conjunction with the non-limiting examples and the accompanying drawings, in which:

FIG. 2 shows a Raman spectrum of an as-synthesized solid SWCNT sample produced with Co-TUD-1 (reduction temperature 500° C.).

FIG. 3 depicts 2D photoluminescence contour maps of SWCNT samples produced under different reduction temperatures with Co-TUD-1: a) 500° C., b) 450° C. and c) 400° C. Dominating tubes (6,5) and (9,8) are highlighted.

FIG. 4 depicts a UV-vis-NIR absorbance spectrum of a purified SWCNT suspension, produced with Co-TUD-1 (reduction temperature 500° C.).

DETAILED DESCRIPTION OF THE INVENTION

Figure 1A:
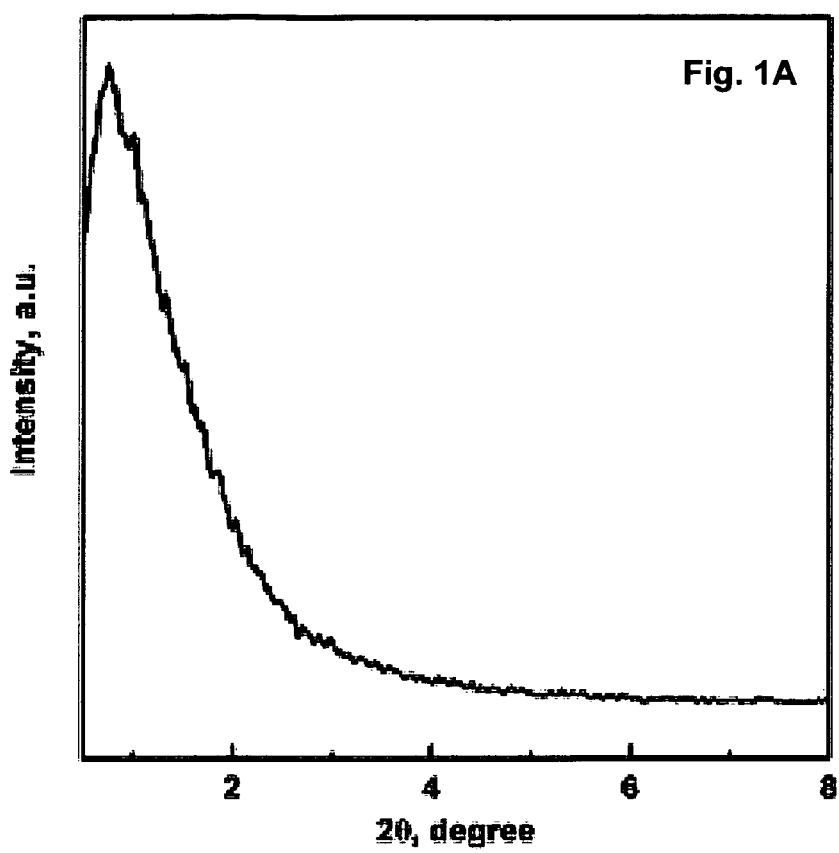
FIG. 1 depicts the physical and chemical structures of Co-TUD-1. (A) X-ray diffraction, (B) nitrogen physisorption showing isotherms and pore size distribution (insert), (C) UV-vis absorption spectra of Co-TUD-1 and the $Co_3O_4$ reference, and (D) $H_2$-temperature programmed reduction.
Figure 1B:
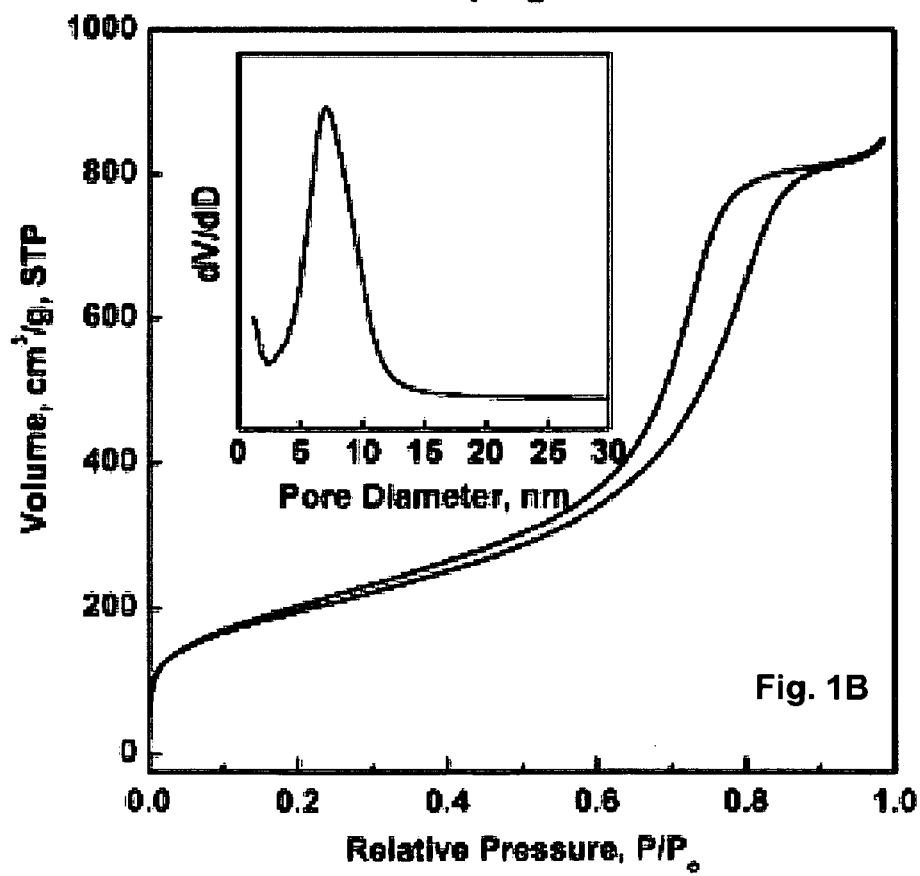
Figure 1C:
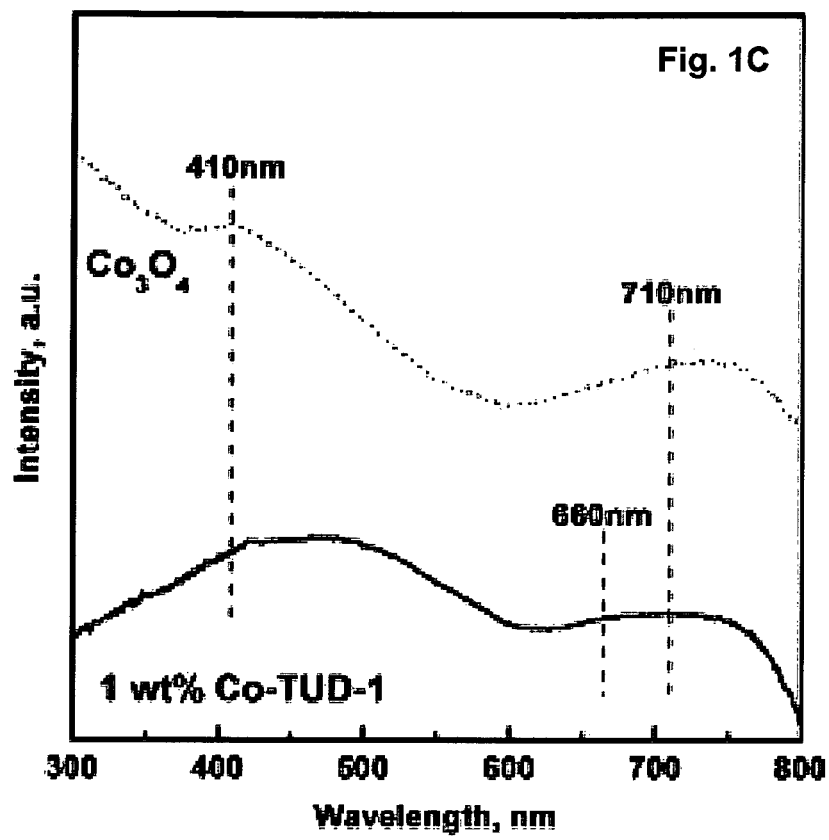
Figure 1D:
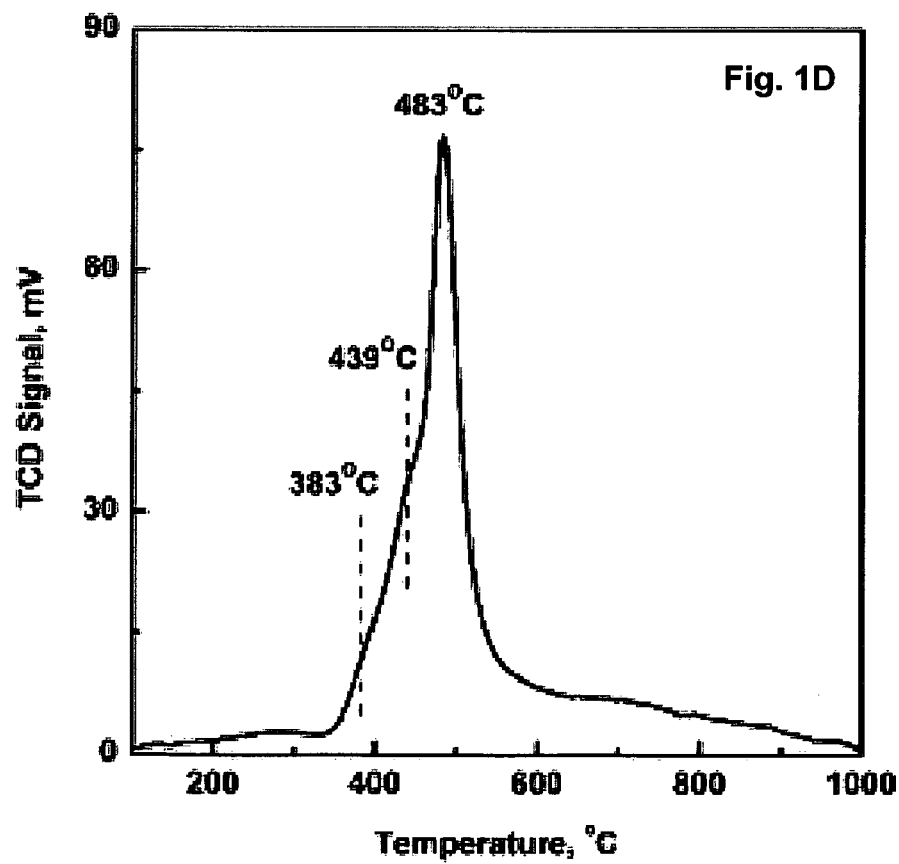

The present invention provides a method of forming single-walled carbon nanotubes. A carbon nanotube may be of any length and diameter. In some embodiments it may have a diameter of about 1-200 nm, such as about 3-200 nm or about 1-100 nm. Atomic Force Microscopy (AFM) and/or Raman Scattering Spectroscopy may for instance be used to determine the dimensions of single-walled carbon nanotubes formed in a method of the invention. A respective nanotube may be metallic, a semiconductor or an insulator.

Mesoporous TUD-1 silicate that includes a suitable catalytically effective metal according to the invention has a surprisingly high selectivity toward the formation of single-walled carbon nanotubes. The term "included" when used in the context of a metal and a silicate includes embodiments where the metal is grafted onto the silica. For sake of clarity the expression "grafted" is nevertheless added frequently in the following. Using the mesoporous TUD-1 silicate, preferentially single walled carbon nanotubes are formed, including at least essentially only single walled carbon nanotubes. The term "at least essentially" in the context of single walled carbon nanotubes refers to the presence of less than about 10%, less than about 5%, less than about 2%, less than about 1%, less than about 0.5%, less than about 0.1% or less than about 0.05% single walled carbon nanotubes. Typically exclusively single walled carbon nanotubes, i.e. no multi-walled carbon nanotubes, are formed. In this regard the inventors did not find any indication of multi-walled carbon nanotubes when carrying out the method of the invention.

A carbon nanotube is a cylinder of rolled up graphitic sheets. Single-walled carbon nanotubes (SWCNTs) represent a unique class of carbon nanotubes in that they contain only one layer of graphite sheet. Both single- and multi-walled carbon nanotubes are known. In carbon nanotubes, the number of shells of the nanotube can vary from one, i.e., constituting a single-wall carbon nanotube (SWCNT), to as many as 50 shells, each pair of adjacent shells in such structure having a spacing between layers that is on the order of ~0.34 nanometers. Carbon nanotubes (CNTs) are typically 1-50 nanometers in diameter and a few micrometers in length, although SWCNTs have been grown to over 300 micrometers in length. The carbon nanotubes formed in the method of the invention may be of any desired length, such as in the range from about 10 nm to about 10 µm. The conductivity of the carbon nanotubes used may be freely selected according to any specific requirements of particular embodiments. Depending on the arrangement of the carbon hexagon rings along the surface of the nanotube carbon nanotubes can be metallic or semiconducting. Any such carbon nanotubes may be formed in a method according to the present invention.

Such nanotubes can be formed in arc-evaporation processes using a small amount of transition-metal powder, such as cobalt, nickel or iron. The metal in such process serves as a catalyst to prevent the growing tubular structure from wrapping around and closing into a smaller fullerene cage. The presence of the metal catalyst also permits the growth process to be reduced in temperature. Single-walled carbon nanotubes can be produced in yield proportions of more than 70%.

These nanotubes self-organize into bundles—ropes more than 1/10$^{th}$ of a millimeter in length. Single-walled carbon nanotubes can also be produced by catalytic decomposition of stable carbon-containing molecules, including e.g. ethylene, in the gas phase, on pre-formed catalyst particles at appropriate temperature.

Contacting the gaseous carbon source or feedstock with the mesoporous TUD-1 silicate may be carried out in any suitable conditions for an appropriate contacting time to grow carbon nanotubes. For example, a continuous, batch, semi-batch, or other mode of processing appropriate to the specific implementation of the manufacturing operation may be employed. Contacting may for instance be carried out in a reactor operated as a fluidized bed reactor, through which the gaseous carbon source is flowed as the fluidizing medium. The carbon-containing gas may for example be fed into a reactor cell having catalytic particles of TUD-1 silicate disposed therein. Any pressure may be applied. Typically the gaseous carbon source is applied at a pressure in a range from about 1 to about 20 atm, such as 1 to about 15, about 2 to about 15 atm, 1 to about 12 atm, about 2 to about 12 atm or about 2 to about 10 atm. In some embodiments the pressure is selected in the range from about 2 atm to about 9 atm, such as 3, 4, 5, 6, 7, 8 or 9 atm. In some embodiments contacting is carried out at temperature in a range of from about 300 to about 700° C., pressure in a range from about 1 to about 12 atm, contacting time of about 1 second to about 10 minutes, and flow rates and compositions that are effective for growth of the carbon nanotubes. Contacting may in some embodiments be conducted at temperature in a range of from about 480 to about 600° C., and pressure in a range of about 1 to about 5 atm.

The carbon source material may include a carbon source gas such as CO, methane, ethane, propane, butane, ethylene, propylene, acetylene, octane, benzene, naphthalene, toluene, xylene, mixtures of $C_1$-$C_{20}$ hydrocarbons, an organic alcohol, e.g. methanol, ethanol, n-propanol, isopropanol, n-butanol, isobutanol, neobutanol or tert-butanol or any other suitable material, typically in gaseous form, that is efficacious in contact with the TUD-1 silicate under the appertaining process conditions for growing carbon nanotubes. An inert gas such as argon may be mixed with the gaseous carbon source before contacting the TUD-1 silicate.

The TUD-1 silicate has a three dimensional irregular pore system and can thus be seen as sponge-like. It thereby allows for fast diffusion into an out of the silica pores. In addition TUD-1 is of particularly high stability and capable of incorporating other metals. TUD-1 can be formed in a procedure that is based on the sol-gel process. This process includes the generation of a sol that includes silicate. Such a sol is a suspension of colloidal silica-based particles, for instance nanoparticles. This sol may for instance be generated by reacting, including hydrolyzing, a precursor such as silicon alkoxide. The hydrolysis of a silicon alkoxide is thought to induce the substitution of OR groups linked to silicon by silanol Si—OH groups, which then lead to the formation of a silica network via condensation polymerisation. Examples of silicon alkoxides include for instance methyl silicate (Si(OMe)$_4$), ethyl silicate (Si(OEt)$_4$), propyl silicate (Si(OPr)$_4$), isopropyl silicate (Si(Oi-Pr)$_4$), pentyl silicate (Si(OCH$_5$H$_{11}$)O$_4$), octyl silicate (Si(OC$_8$H$_{17}$)$_4$), isobutyl silicate (Si(OCH$_2$iPr)$_4$), tetra(2-ethylhexyl) orthosilicate (Si(OCH$_2$C(Et)n-Bu)$_4$), tetra(2-ethylbutyl) silicate (Si(OCH$_2$CHEt$_2$)$_4$), ethylene silicate ((C$_2$H$_4$O$_2$)$_2$Si), tetrakis(2,2,2-trifluoroethoxy)silane (Si(OCH$_2$CF$_3$)$_4$), tetrakis(methoxyethoxy)silane (Si(OCH$_2$CH$_2$OMe)$_4$), benzyl silicate or cyclopentyl. In some embodiments sol preparation by hydrolysis of a silicon alkoxide is carried out in water. In some embodiments sol preparation can be performed in a mixture of water and an alcohol such as ethanol or isopropanol.

In the formation of TUD-1 a chelating agent is used to chelate, i.e. form a coordination complex with, silicon. In some embodiments triethanolamine may be added as a chelating agent. Triethanolamine causes the formation of a silatrane, which can dimerise, trimerise and further oligomerise. In some embodiments as a chelating agent to chelate silicon tetraethyleneglycol may be added. Tetraethyleneglycol can form a complex with both silicate and any catalytically active metal oxide added (see below). In addition tetraethyl ammonium hydroxide may be added. Tetraethyl ammonium hydroxide and tetraethyleneglycol induce microporosity into the obtained product. Thereby tetraethyl ammonium hydroxide/tetraethyleneglycol ensure that a continuous scale of pores, ranging from 20 nm down to less than 1 nm is formed. Tetraethyl ammonium hydroxide and tetraethyleneglycol can be recycled after use in TUD-1 formation if desired. As further explained below, other metal salts, metal oxides or metal alcoholates (e.g. alkanoates) may be added upon or shortly after contacting the silicon alkoxide and triethanolamine or tetraethyleneglycol.

If desired, the sol may be deposited onto a surface, for instance by means of spin coating on a substrate. The sol further undergoes a catalysed transition to form a gel, which is dried to form a solid. If desired the obtained solid may be ground. The solid may be hydrothermally treated in order to complete the inorganic condensation reaction. This heat treatment, which may be taken to be a catalysis annealing step may be conveniently carried out in a sealed container that allows handling steam, such as an autoclave. Any period of time may be selected for annealing the gel. Typical periods of time used in the art may be employed, for example within the range of about 2 sec to about 1 minute, such as e.g. 15 sec or 20 sec. The heat treatment may furthermore be repeated where desired. Where desired the formed silicate may then be exposed to a further consolidation heat treatment to remove undesired organic matter.

The solid obtained from drying the gel (supra) may also be exposed to careful calcination (vide infra) in order to complete the inorganic condensation reaction. The porous structure is likewise created, i.e. without hydrothermal treatment, if a low ramp rate of about 1° C./min is used. Both hydrothermal treatment at moderately high temperature and thermal treatment, i.e. calcination, with a low ramp rate complete the condensation reactions of the various silica species after the gel formation. Si-alkoxy bonds are of more labile nature than Si-siloxy bonds. Hence, at elevated temperatures the silica oligomers condense extensively, and the silatranes formed with tetraethyl ammonium hydroxide and the tetraethyleneglycol complexes, respectively, partially or fully hydrolyze. Separation of tetraethyl ammonium hydroxide/tetraethyleneglycol and silica network occurs. Meso-sized aggregates of tetraethyl ammonium hydroxide/tetraethyleneglycol form, templating the mesopores.

The obtained raw TUD-1 may be calcined, for example using the rapid thermal processing (RTP) technique. Calcination may be carried out at elevated temperature with the exact temperature being chosen at a value that does not prevent a later catalytic activity to occur. The increase in temperature may be generated by any means, including irradiation. In some embodiments the elevated temperature is within a range of about 450° C. to about 1000° C., for example in the range of about 500° C. to about 800° C. In some embodiments the elevated temperature is about 600° C. Any period of time may be selected for annealing the gel. Typical periods of time used in the art may be employed, for example within the range of about 30 minutes to about 24 hours, such as e.g. about 1 hour to about 12 hours, about 2 hours to about 12 hours or about 6 hours to about 12 hours.

Calcination removes the triethanolamine or tetraethyleneglycol. For the same purpose extraction, e.g. Soxhlet extraction, can be employed.

TUD-1 is a mesoporous silicate that is formed without a surfactant or liquid-crystal template, but with triethanolamine or tetraethyleneglycol. Triethanolamine can act as a template in mesopore formation, as well as a metal complexing agent. The metal can therefore be grafted onto the silicate or substituted into the silicate framework, depending on the concentration of the metal used (Hamdy et al., 2006, supra). Albeit TUD-1 has a sponge-like structure with high substrate accessibility, grafting may in some embodiments be preferred due to the better accessibility of metal centers. In either case the metal is added and forms complexes with tetraethyleneglycol or metal atranes via the action of triethanolamine (supra), either of which together with free triethanolamine/tetraethyleneglycol template the mesopores. No metal oxide particles form due to this formation of metal atranes or tetraethyleneglycol complexes. During calcination these complexes decompose and any organic species are removed. Only if high amounts of the additional metal are used, metal oxide nanoparticles form. Therefore the metal is typically grafted onto the surface of (i.e. within) the mesopores in form of oxide species, if higher amounts of metal are used. Depending on the loading these can be highly disperse monomeric sites or small oxide clusters. If lower amounts of metal are used, the metal is incorporated into the framework of TUD-1 in the form of isolated atoms. The exact threshold value, which depends on the metal used, can be easily determined in a preliminary test, based on the data published previously (e.g. Shan et al., 2001, supra or Hamdy et al., 2006, supra). Typically the threshold value can be expected in the range of Si/M rations of about 50, at the latest of Si/M rations of about 25. Accordingly the levels of the metal present in the TUD-1 can be controlled so that the mesoporous silica has a high thermal stability, thus allowing for the catalyst to retain its intrinsic mesostructure under thermal CVD conditions. Small catalyst particle sizes are believed to provide smaller diameter Single-Walled Carbon Nanotubes.

In embodiments described above the metal is included into or grafted onto the silicate already during the formation of the latter. In some embodiments the TUD-1 is formed in a first step and the metal is grafted thereon subsequently, in a later step. Such subsequent grafting can be carried out using conventional impregnation or standard post-synthesis grafting, for example at an elevated temperature in a suitable solvent such as an aromatic solvent, e.g. toluene—typically under an inert gas such as argon or $N_2$.

The size of the mesopores of TUD-1 can be tuned according to the selected conditions of its formation (see e.g. Shan et al., 2001, supra or Hamdy et al., 2006, supra). The pore size may for example be selected in the range from about 2 to about 25 nm, including about 25 to about 20 nm, i.e. 25 to about 200° A (ibid.). The surface area can be adjusted to be from about 400 to about 1000 $m^2g^{-1}$.

The metal that is incorporated into or grafted onto the TUD-1 may be any metal that is suitable for catalyzing the formation of nanotubes. The metal may for example be selected from groups 3 to 13 of the periodic table of the elements, e.g. a transition metal of one of groups 3 to 12 or 4 to 0.12 of the periodic table of the elements. Illustrative examples include a group 3 element such as Y, a group 6 element such as W or Mo, a group 8 element such as Fe or Ru, a group 9 element such as Co, Ir or Rh, a group 10 element such as Ni, Pt, or Pd or a Lanthanoid such as La, Ce, Pr, Nd, Gd, Tb, Dy, Ho, Er or Lu. In some embodiments the metal is a transition metal, for instance a first row transition metal.

In some embodiments the mesoporous TUD-1 silicate is arranged on a substrate, to which it may be affixed. In such an embodiment the substrate may provide a support surface for the catalyst, and the catalyst can be affixed to the surface of the substrate as a thin film or in any desired various pattern. Suitable materials for the substrate include but are not limited to, alumina, silicates, aluminium silicates, quartz, carbon, and metals, including but not limited to, gold, platinum, palladium and molybdenum. If desired, the substrate may have a substantially planar surface. The substrate may for instance be a flake or a wafer, including a Si wafer. The TUD-1 silicate may be calcined on such a substrate for an appropriate time and at an appropriate temperature in order to provide a 3D mesoporous structure as well as metal or metal oxide nanoparticles. The catalyst may for example be affixed to the substrate using dip-coating, drop-coating, or spin-coating. The catalyst may also be affixed to the substrate using photolithography or soft lithography. As an illustrative example, the catalyst may be affixed to a suitable substrate and the catalyst-containing substrate may be heated for about 2 hours at a temperature of about 550° C. in order to calcine the catalyst. The catalyst-containing substrate may for instance be heated in air.

In the method of the invention the TUD-1 silicate with the additional metal included therein or grafted thereon (supra) is further reduced to form an activated catalyst. The TUD-1 silicate in its state before reduction can be taken to be a TUD-1 source silicate. Where metallic catalyst particles that are included in the TUD-1 silicate are present in an oxidized form, they are converted into a reduced form by this reduction. Reduction is typically carried out by contacting the TUD-1 silicate with a reducing gas such as e.g. hydrogen, an amine, ammonia, diborane, sulphur dioxide, hydrazine, including a flowing reducing gas such as flowing hydrogen. Thereby the additional metal included into or grafted onto the TUD-1 silicate is provided in a catalytically active form. As explained below, the reaction conditions, including the duration and temperature, can be used to control the product in terms of the major chiral indices and distribution of chiral indices.

In the method of forming SWCNTs typically a carbon source in the gas phase and an energy source such as a plasma or a heated coil are used, wherein the energy source transfers energy to the gaseous carbon source, thereby causing its decomposition into reactive carbon atoms. Such a process is generally chemical vapour deposition. Via action of the catalytically active metal carbon nanotubes are formed. A variety of chemical vapour deposition (CVD) techniques are known in the art. Any of these techniques can be employed in the method of the invention that is based on employing a solid silica-supported catalyst. Examples include, but are not limited to, plasma enhanced CVD, thermal chemical CVD, alcohol catalytic CVD, laser-assisted thermal CVD or high pressure CO disproportionation CVD. Plasma enhanced CVD uses a glow discharge in a chamber or furnace and an electrode. Thermal chemical vapour deposition is usually carried out in a furnace, where the substrate is brought to a high temperature. Alcohol catalytic CVD can be carried out at temperature below 600° C. (such as about 550° C.) and is based on the use of evaporated alcohols. Laser assisted thermal CVD employs a continuous wave $CO_2$ laser.

The chemical vapour deposition process may be carried out at a preselected temperature, e.g. furnace temperature, of from about 350° C. to about 1000° C., such as from about 400° C. to about 950° C., about 450° C. to about 1000° C., about 450° C. to about 950° C., about 500° C. to about 1000° C., about 500° C. to about 950° C., about 550° C. to about 950° C., about 600° C. to about 950° C., about 650° C. to about 950° C., including in the range of about 700° C. to about 950° C., about 700° C. to about 900° C., about 700° C. to about 850° C. about 700° C. to about 800° C., about 750° C. to about 850° or about 750° C. to about 800° C. In another embodiment, the CVD process is carried out at a furnace temperature of about 850° C. The CVD process may be carried out for a time of about 1 minute to about 4 hours, such as from about 10 minutes to about 2 hours or from about 20 minutes to about 1 hour, including e.g. 45 minutes or 30 minutes. In one embodiment, the CVD process is carried out at a furnace temperature of about 800° C. for a time of about 60 minutes. In one embodiment, the CVD process is carried out at a furnace temperature of about 850° C. for a time of about 30 minutes.

Depending on the conditions used, including the topography of the surface of a substrate (supra), nanotubes with various orientations can be obtained. In one embodiment parallel arrays of single-walled carbon nanotubes are formed. In one embodiment, single-walled carbon nanotubes in the form of individual single-walled carbon nanotubes are formed. In one embodiment a two-dimensional network of single-walled carbon nanotubes is formed.

In the method describe herein, the majority of the single-walled carbon nanotubes thus formed have diameters within a predetermined range. Generally, the formed carbon nanotubes have a narrow diameter distribution. In typical embodiments the majority of the formed carbon nanotubes are of uniform diameter. Typically most of the SWCNTs have diameters around 0.7 nm. Depending on the selected temperature for activation/reduction, the number/amount of additional SWCNTs with higher or smaller diameter may differ. For example, when the reduction temperature is about 500° C., SWCNTs with a diameter of 0.757 nm are by far the dominating species. When the reduction temperature is decreased the number of SWCNTs with smaller diameter generally decreases. When the reduction temperature is increased the number of SWCNTs with smaller diameter generally increases.

Figure 5B:
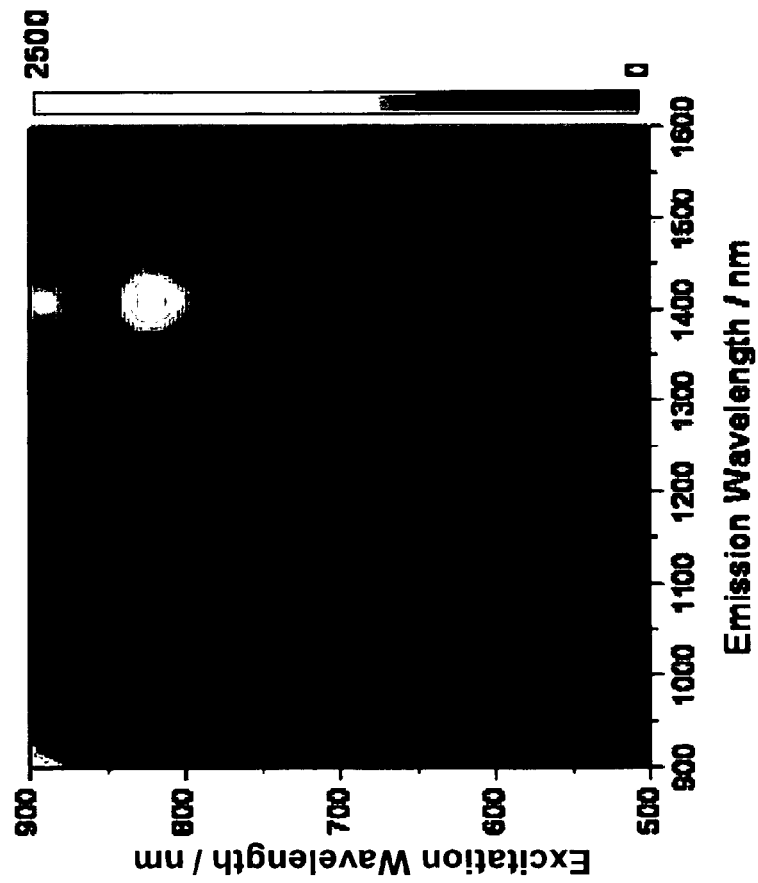
FIG. 5 depicts 2D photoluminescence contour maps of SWCNTs samples produced under different reduction temperatures with Co-TUD-1: A) 300° C., and B) 200° C. Dominating tubes (9,8), (10,8) and (10,9) are highlighted.
Figure 5A:
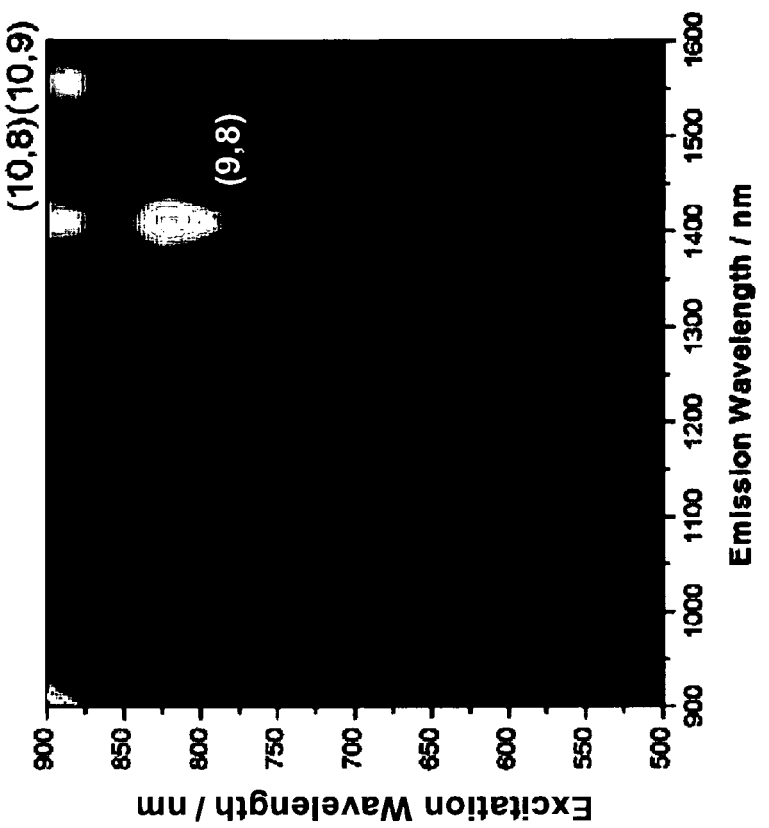
Figure 6:
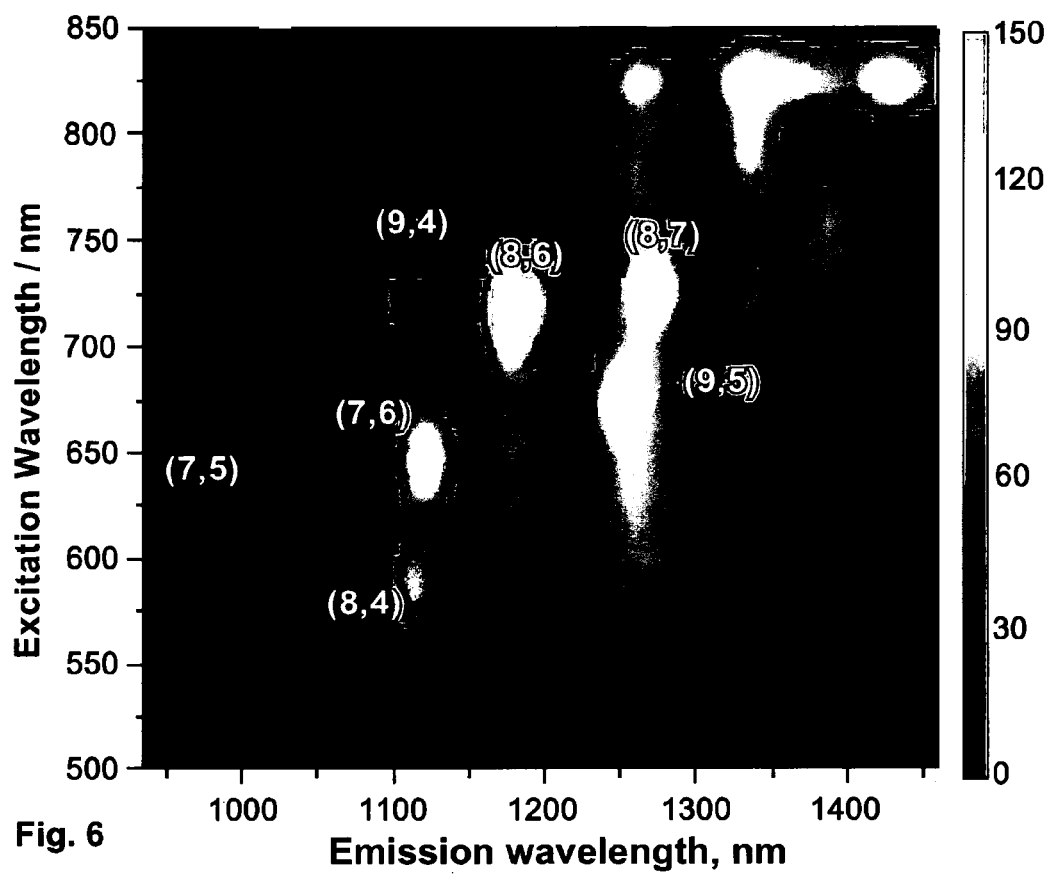
FIG. 6 depicts 2D photoluminescence contour maps of SWCNTs samples produced with Ni-TUD-1. Dominating tubes such as such as (8,6) are highlighted. SWCNT samples producted with Fe-TUD/1 yielded similar results.

In terms of chiral indices (supra), these characteristic of the carbon nanotubes formed can be controlled by adjusting the conditions for providing the activated catalyst. In particular the reduction temperature (e.g. 0 to 800° C.) and the exposure time (e.g. 0 to 1 hours) of the TUD-1 source silicate to one or more reducing agents, such as $H_2$, the major chiral indices can be selectively chosen. The presence and amount of other chiral species, i.e. beside the major chiral indices, may be adjusted in the same way. In some embodiments the dominant chiral indices are indices (6,5) (cf. FIG. 3). In some embodiments the dominant chiral indices are indices (9,8) (cf. FIG. 5). As an illustrative example, additional indices that may be characteristic of further carbon nanotubes formed in addition to (9,8), are for instance (8,4) and (7,6). The exact combination of reduction conditions suitable for selected chiral indices can be conveniently determined using a few test values and will also depend on the metal incorporated into the TUD-1 (cf. FIG. 6). It is within the knowledge of the person skilled in the art to empirically determine the suitable reaction conditions to obtain carbon nanotubes of a desired chirality.

In some embodiments the majority of the formed carbon nanotubes are of the indices (6,5). In some embodiments at least about 30% of all formed SWCNTs, including at least about 35%, at least about 40%, at least about 45%, at least about 50%, at least about 55%, at least about 60%, at least about 65%, at least about 70%, at least about 75%, at least about 80% or at least about 85% of all formed SWCNTs have the indices (6,5). The selectivity can also be shifted to other chiral species, such as (9,8), (7,6), and (7,5). In some embodiments the majority of the formed carbon nanotubes are of the indices (9,8). In some embodiments at least about 30% of all formed SWCNTs, including at least about 35%, at least about 40%, at least about 45%, at least about 50%, at least about 55%, at least about 60%, at least about 65%, at least about 70%, at least about 75%, at least about 80% or at least about 85% of all formed SWCNTs have the indices (9,8). Depending on the selected temperature for activation/reduction, the number/amount of additional SWNTs with other indices may differ (see FIG. 3). For example, when the reduction temperature is about 500° C., SWNTs of the indices (6,5) are by far the dominating species. When the reduction temperature is decreased the number of SWNTs of other indices, in particular of indices (7,5), (7,6) and (9,8) increases.

In order that the invention may be readily understood and put into practical effect, particular embodiments will now be described by way of the following non-limiting examples.

EXEMPLARY EMBODIMENTS OF THE INVENTION

As an example of carrying out the method of the invention, the synthesis of Co incorporated TUD-1 is disclosed in the following. TUD-1 with incorporated Fe or Ni has likewise been produced by the inventors and found to be equally suitable (see FIG. 6). It is demonstrated that Co-TUD-1 can grow SWCNTs with very narrow (n,m) distributions with high productivity. The Examples also demonstrate that (n,m) selectivity on the respective Co-TUD-1 catalyst can be manipulated by changing the reduction temperature of the catalyst in hydrogen. Co-TUD-1 is a good candidate for industrial scale production of narrow (n,m) distribution SWCNTs.

For use as a catalyst, metal incorporated TUD-1 (e.g., cobalt incorporated TUD-1), was synthesized, characterized, and applied for the growth of single-walled carbon nanotubes (SWCNT). Other metals (other than Co) may be used for incorporation with TUD-1 to form the catalyst. The property of Co-TUD-1 has been investigated using several characterization techniques and it is found to have large surface area (740 m$^2$/g), well defined pore size (7.4 nm) and uniform cobalt reducibility. The SWCNT samples produced using Co-TUD-1 is highly selective for SWCNT. The reduction temperature is discovered to be an important factor which can shift the SWCNT (n,m) distribution. Prereduced at 500° C. reduction temperature, the Co-TUD-1 produces small diameter SWCNT with a narrowly (n,m) distribution. This work reveals the promising application of Co-TUD-1 in SWCNT production and it is cheaper and easier to synthesize compared to Co-MCM-1.

Example 1

Co-TUD-1 Synthesis

Co-TUD-1 with 1 wt. % cobalt was synthesized following a modified method reported by Hamdy et al. (2006, supra). In a typical synthesis, 0.28 g of cobalt (II) sulphate heptahydrate (CoSO$_4$.7H$_2$O, >99%, Sigma-Aldrich) was dissolved in distilled water, and then added dropwise into 10 g of tetraethyl orthosilicate (TEOS, >98%, Sigma-Aldrich) under vigorous stirring. After stirring for 0.5 h, 7.2 g of triethanolamine (TEA, >98.5%, Fluka) and 1.8 g of distilled water were added dropwise into TESO solution, and further stirred for 2 h. Subsequently, 6.1 g of tetraethyl ammonium hydroxide (TEAOH, 35%, Sigma-Aldrich) was added to the mixture, which was then aged for 24 h at room temperature. After aging, the mixture was dried at 100° C. for 24 h, and then hydrothermally treated in a Teflon-lined stainless steel autoclave for 8 h at 180° C. The final product was calcined at 600° C. for 10 h under a steady airflow to remove any organic templates. The total synthesis process takes about 3 days, which is less than half of time required in previous Co-MCM-41 synthesis (Lim, S, et al., J. Phys. Chem. B (2003) 107, 11048).

Fe-TUD-1 and Ni-TUD-1 were produced following the same protocol, iron (II) sulfate heptahydrate and nickel (II) sulfate heptahydrate were employed, respectively.

Example 2

Co-TUD-1 Characterization

Physical and chemical properties of Co-TUD-1 catalysts were characterized by ray diffraction (XRD), nitrogen physisorption, UV-vis spectrosocpy, and $H_2$-temperature programmed reduction (TPR). XRD measurements were conducted using a Bruker Axs D8 X-ray diffractometer (Cu K$\alpha$, $\lambda$=0.15, 4 nm, 40 KV, 30 mA). Prior to test, samples were dried at 100° C. overnight. Nitrogen adsorption-desorption isotherms were measured at 77 K with a Quantachrome Autosorb-6b static volumetric instrument. Prior to analysis, the samples were outgassed at 350° C. under vacuum. The specific surface area was calculated following the method of Brunauer, Emmet, and Teller (BET). The pore size and pore size distribution were calculated by the Barrett, Joyner, and Halenda (BJH) method using the desorption branch of the isotherms. UV-vis diffuse reflectance spectra were recorded on a Varian 5000 UV-vis near-infrared spectrophotometer. The spectra were recorded in the range of 200-800 nm with pure $BaSO_4$ as a reference. All samples were dried at 100° C. overnight before performing the test. The reducibility of calcined catalysts was characterized by TPR using the thermal conductivity detector (TCD) of a gas chromatography (Techcomp, 7900). Approximately 200 mg of each sample was loaded into a quartz cell. Prior to each TPR run, the sample cell was purged by air at room temperature, then the temperature was increased to 500° C. at 5° C./min, soaked for 1 h at the same temperature, and cooled to room temperature. This procedure produces a clean surface before running the $H_2$-TPR. The gas flow was switched to 5% $H_2$/Ar, and the baseline was monitored until stable. After baseline stabilization, the sample cell was heated at 5° C./min and held for 30 min at 900° C. An acetone trap was installed between the sample cell and the TCD to condense water, produced by sample reduction.

Example 3

SWCNT Growth and Characterization

The SWCNT Synthesis using Co-TUD-1 was performed using a pressured CO chemical vapor deposition system. The carbonyls in CO were removed by a Nanochem Purifilter from Matheson Gas Products. Co-TUD-1 catalysts of 200 mg were firstly prereduced at 400 to 500° C. under $H_2$ at (1 bar, 50 sccm) for 0.5 h. The reactor temperature was further increased to 800° C. under Ar flow. The pressured CO (6 bar, 100 sccm) was then introduced into the reactor at 800° C. and lasted 1 h for SWCNT formation. As-grown SWCNTs on Co-TUD-1 were pressed into thin wafers and investigated by Raman spectroscopy. Spectra were collected with a Renishaw Ramanscope in the backscattering configuration over several random spots on samples using both 633 nm and 785 nm lasers. Laser energies of 2.5-5 mW were used to prevent destroying SWCNT samples during the measurement. Integration times of 20 s were adapted. No significant difference was found in their Raman spectra compared with those from SWCNTs on filter membranes after TUD-1 support removal. The total carbon loading was determined on as-synthesized catalysts by thermogravimetric analysis (TGA). Furthermore, the as-synthesized catalysts loaded with carbon deposits were further refluxed in 1.5 mol/L NaOH to dissolve the silica matrix and filtered on a nylon membrane (0.2 μm pore). The purity of resulting carbon deposits were also evaluated: by TGA after silica support removal. TGA was conducted on PerkinElmer Diamond TG/DTA equipment. For a typical measurement, about 1 mg sample (either as-synthesized catalysts or carbon deposits after silica removal) was loaded to an alumina pan. The sample was firstly heated to 110° C., and was held at 110° C. for 10 minutes in the 200 mL/min air flow to remove any moisture. Then the temperature was continually hiked from 110° C. to 1000° C. at a 10° C./min ramp. The weight of the sample was monitored and recorded as a function of the temperature. The same procedure was repeated after the sample was cooled to room temperature and another weight/temperature curve was obtained serving as a baseline. The filtered carbon deposits were further suspended in 2 wt % sodium dodecyl benzene sulfonate (SDBS) (Aldrich) $D_2O$ (99.9 atom % D, Sigma-Aldrich) solution by sonication in a cup-horn ultrasonicator (SONICS, VCX-130) at 100 W for 0.5 hour. After sonication, the suspension was centrifuged for 1 hour at 50,000 g. The clear SWCNT suspensions obtained after centrifugation were characterized by photoluminescence (PLE) and UV-vis-NIR absorption spectroscopy. PLE was conducted on a Jobin-Yvon Nanolog-3 spectrofluorometer with the excitation scanned from 300 nm to 850 nm and the emission collected from 900 nm to 1400 nm. The UV-vis-NIR absorption spectra were measured on a Varian Cary 5000 UV-vis-NIR spectrophotometer.

Results and Discussion

XRD was applied to characterize the structure of Co-TUD-1. Part A of FIG. 1 illustrates the low angle XRD pattern for the prepared 1 wt % Co-TUD-1 sample. An intense diffraction peak at the vicinity of 2θ=0.8° to 1.0° indicates the highly ordered mesoporous structure for the synthesized Co-TUD-1 (Jansen, J C, et al., Chemical Communications (2001) 713). Nitrogen physisorption was used to provide more detailed physical structures of Co-TUD-1. The adsorption/desorption isotherm in part B of FIG. 1 shows a step increase in nitrogen uptake in the relative pressure ($P/P_0$) of 0.5-0.8, representing a typical mesoporous structure. The isotherm also shows a hysteresis belonging to a type IV isotherm. The Co-TUD-1 samples exhibit well defined pore size around 7.4 nm with a narrow pore size distribution (insert in FIG. 1B). Data extracted from physisorption also indicated that the sample possesses a surface area of 740 $m^2/g$ and a large pore volume of 1.42 mL/g.

The chemical structures of Co-TUD-1 were characterized by UV-vis spectroscopy and TPR. UV-vis spectra in part C of FIG. 1 designate the local environment of Co in the TUD-1 silica template. Co-TUD-1 sample exhibits a minor peak shoulder at 660 nm and two broad peaks at 410 and 710 nm. The peak at 660 nm has been assigned to $v_2\ ^4A2\rightarrow\ ^4T_1(P)$ transition indicating the $Co^{2+}$ tetrahedral configuration (Brik, Y, et al., Journal of Catalysis (2001) 202, 118). The absorption peaks at 410 and 710 nm are similar to those detected in the $CO_3O_4$ reference, which are assigned to $v_1\ ^4A_{1g} \rightarrow\ ^1T_{1g}$ and $v_2\ ^1A_{1g} \rightarrow\ ^1T_{2g}$ transitions, indicating octahedral configured $Co^{3+}$ ions (ibid.). It should be noted that the absorption peak for our Co-TUD-1 sample at 410 nm is much broader compared to that of $CO_3O_4$ reference. This may be caused by the masking or overlapping between the 410 nm and additional peaks associated with tetrahedral $Co^{2+}$, which are typically observed in the range of 500 to 600 nm. In addition, no absorption peaks are observed for octahedral $Co^{2+}$ ions, because the extinction coefficient for tetrahedral $Co^{2+}$ ions are usually much stronger than those of octahedral ions. The TPR profile shown in part D of FIG. 1 provides more direct information on the stability of Co ions in the TUD-1 structure. A distinct and narrow reduction peak is centered at 483° C. This reduction temperature is higher than the reduction temperatures of silica particle supported impregnated cobalt catalysts (Vo, M, et al., Journal of Catalysis (2002) 212, 10). Two shoulders at 439° C. and 383° C. can be observed in FIG. 1D. They are corresponding to the reduction process of $CO_3O_4 \rightarrow CoO \rightarrow Co$ on silica particle supported impregnated cobalt catalysts (ibid.). Therefore, the peak at 483° C. can be assigned to the reduction of Co incorporated in the TUD-1 structure.

Overall, various characterization results show that Co-TUD-1 possesses comparable properties against Co-MCM-41 catalysts: highly ordered mesoporous structure, large surface area narrowly distributed pore size, and incorporated stable Co species in the silica template. These properties are considered to be crucial to the production of high quality SWCNT (Lim et al., 2003, supra; Wei, L, et al., Journal of Physical Chemistry C (2008) 112, 17567).

The Raman spectrum was conducted on the as-synthesized SWCNT samples using a 633 nm laser. The spectrum shows intensified RBM peaks demonstrating the abundance of SWCNT in the products (FIG. 2). Although RBM position is in good correlation with SWCNT diameter (Milnera, M, et al., Physical Review Letters (2000) 84, 1324), it is not sufficient to determine the (n,m) distribution of a SWCNT sample due to the resonance Raman effect. To further reveal its (n,m) distribution, PLE and UV-vis-NIR absorption have been measured using purified SWCNT suspension. The peaks in the PLE map (FIG. 3a) can be assigned to roll-up indices (n,m) corresponding to the excitation transition energy of the second subband (E22) and the photon emission energy of the first subband (E11) of specific tube structures (Weisman, R B; & Bachilo, S M, Nano Lett. (2003) 3, 1235). In FIG. 3a, (6,5) dominates in a narrowly distributed (n,m) tubes. The UV-vis-NIR absorption spectrum (FIG. 4) corresponding to E11 transition energy (800-1600 nm) confirmed the dominance of (6,5). The peak positioned at ~1400 nm can be contributed by the large diameter tubes or $H_2O$ (Viscarra Rossel, R A, & McBratney, A B, *Geoderma* (1998) 85, 19. Although $D_2O$ was used as the dispersion solvent, it is impossible to completely avoid the moisture influence during the measurement in an ambient environment. Since the PLE (FIG. 3a) only shows a faint peak attributing to (9,8) in large diameter tubes region (E 11>1400 nm), the inventors speculated that the ~1400 nm peak in the absorption spectrum mainly came from $H_2O$.

The optimization of the catalyst preparation and SWCNT synthesis conditions using Co-MCM-41 (Chen, Y, et al., Journal of Catalysis (2004) 226, 351; Chen, Y, et al., Journal of Catalysis (2004) 225, 453) and CoMoCAT (Alvarez, W E, et al., Carbon (2001) 39, 547; Lolli, G, et al., Phys. Chem. B (2006) 110, 2108; Herrera, J E, et al., Journal of Catalysis (2001) 204, 129) has been systematically studied. The reduction temperature is a key parameter correlating closely with the cobalt state in Co-MCM-41 so that the SWCNT diameter distribution can be varied accordingly (Chen et al., 2004, supra). Therefore, the cobalt clusters in Co-TUD-1 should also be tuned by varying the reduction temperature so that the SWCNT diameter and chirality can be controlled. The TPR profile of Co-TUD-1 (FIG. 1d) shows a narrow peak located at 483° C. with two shoulders at the lower temperature 439° C. and 383° C. Therefore, Cobalt can be reduced partially or entirely under different temperatures and the cobalt cluster sizes can be varied leading to the different SWCNT diameter and (n,m) distribution. The SWCNT were synthesized under different reduction temperatures, 500° C., 450° C. and 400° C. FIG. 3 is the comparison of their photoluminescence (PLE) 2D contour map with the excitation wavelength from 300 nm to 900 nm and the emission wavelength from 900 nm to 1600 nm to maximum the coverage. At 500° C., the SWCNT (n,m) is narrowly distributed with less than 10 semiconducting species can be observed. The dominant species is (6,5) (diameter 0.757 nm) in Co-TUD-1 grown SWCNT whereas in Co-MCM-41 is (7,5) (diameter 0.829 nm) (Wei, L, et al., J. Phys. Chem. C (2008) 112, 10, 2771-2774) under the same growth condition. This should be considered an advantage for Co-TUD-1 over Co-MCM-41 since the smaller diameter distribution suggests less (n,m) species according to SWCNT chirality map. This is preferred by the post-synthesis separation towards a single specie SWCNT extraction using cosurfactant (Wei, L, et al., The Journal of Physical Chemistry B (2008) 112, 2771) or polymer (Chen, F, et al., J. Nano Lett. (2007) 7, 3013). Once the reduction temperature decreased to 450° C. and 400° C., the chirality distribution turns to be broader (FIGS. 3b and c). Although (6,5) SWCNT still exhibited the highest intensity over other (n,m), (9,8) appeared to be stronger. Referring to the TPR profile in FIG. 1d, $CO_3O_4$, CoO and incorporated Co can be subsequently reduced at 400° C., 450° C. and 500° C., respectively. $CO_3O_4$ and CoO are located at the surface of the TUD-1 silica structure and can be reduced at a low temperature. These completely reduced clusters may sinter into larger clusters during the heating to the SWCNT synthesis temperature (800° C.) so that the larger diameter tubes such as (9,8) is produced. As the increase of the reduction temperature to 500° C., the incorporated cobalt is reduced to small clusters. These clusters are more stable than the ones reduced from $CO_3O_4$ and CoO therefore they could remain at smaller size. The similar phenomenon was observed in Co-MCM-41 and the anchoring effect was considered as the cause of the cobalt cluster stability (Chen, Y, et al., Journal of Catalysis (2004) 225, 453). It was analysed whether the same effect also applied in the TUD-1 which shares a similar curvature structure. By controlling the reduction temperature, the SWCNT (n,m) distribution can be shifted and the narrowest (n,m) distribution can be obtain at 500° C.

Figure 7:
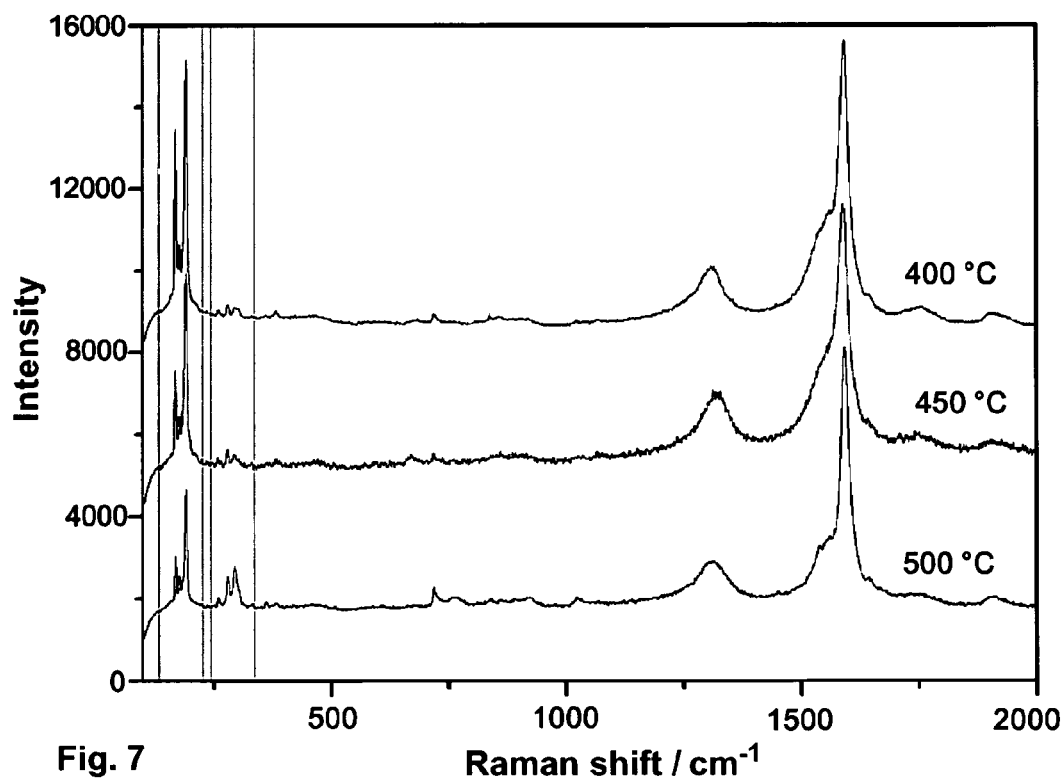
FIG. 7 depicts Raman spectra measured using as-synthesized SWCNT samples produced using Co-TUD-1 at different temperatures under 633 nm laser.

To further confirm the reduction temperature effect on the SWCNT chirality selectivity, Raman spectroscopy was performed on the as-synthesized SWCNT samples under 633 nm laser shown in FIG. 7. Although the abundance evaluation of (n,m) tubes for bulk SWCNT samples are complicated requiring both continuous laser excitation Raman spectroscopy and intrinsic properties of each chiral species, it still can be discovered that under 500° C., more smaller diameter tubes were produced compared with 450° C. and 400° C. as the RBM position is in inverse proportion of SWCNT diameter (Milnera et al., 2000, supra). The RBM peaks located in green region corresponding to smaller diameter tubes became intensified as the increase of reduction temperature and vice versa for the blue region RBM peaks. From this point of view, the Raman spectra are consistent with PLE results.

Figure 8:
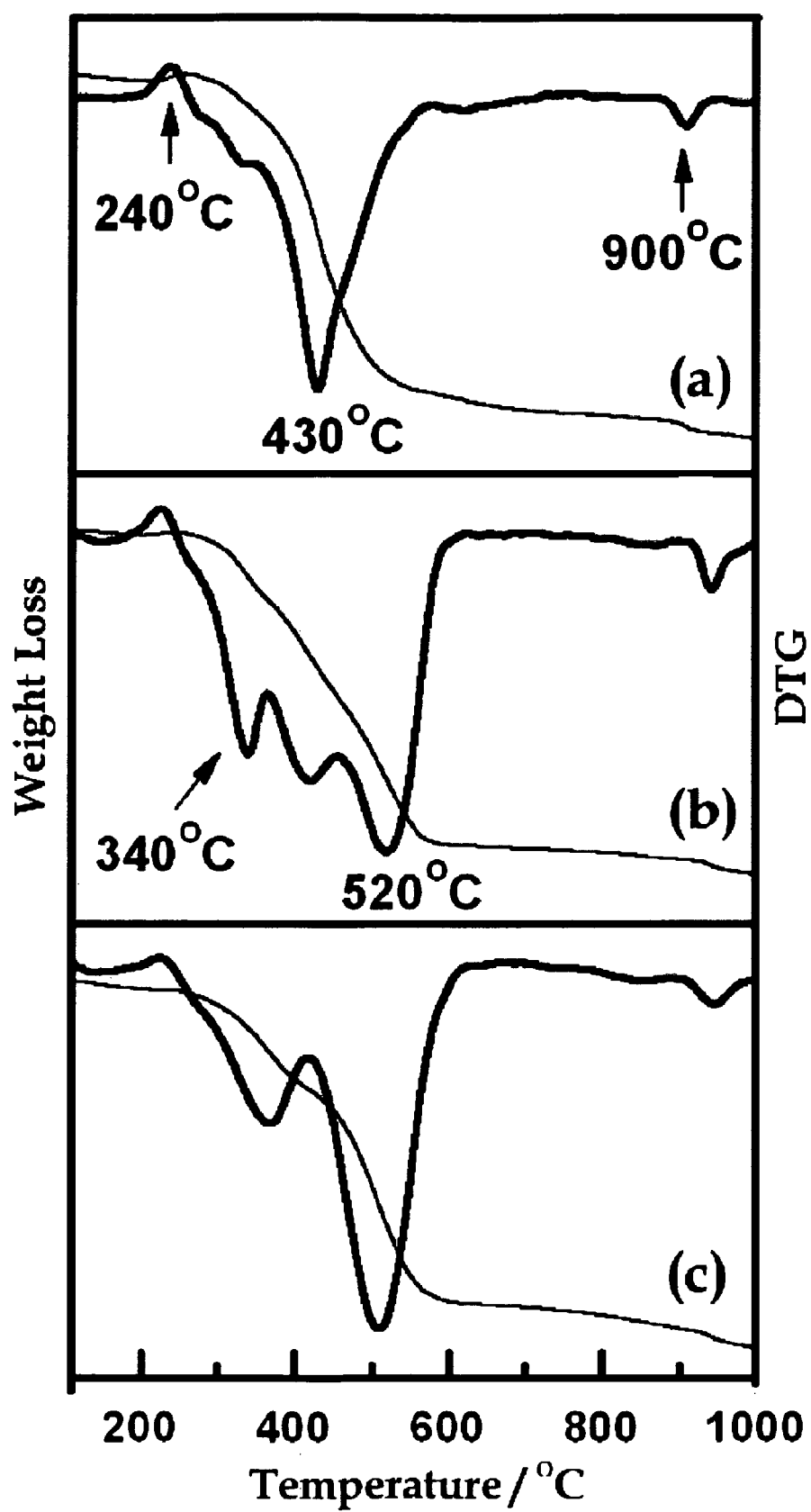
FIG. 8 depicts a thermogravimetric analysis of SWCNT samples produced using Co-TUD-1 prereduced at (a) 500° C. (b) 450° C. and (c) 400° C.
Figure 9:
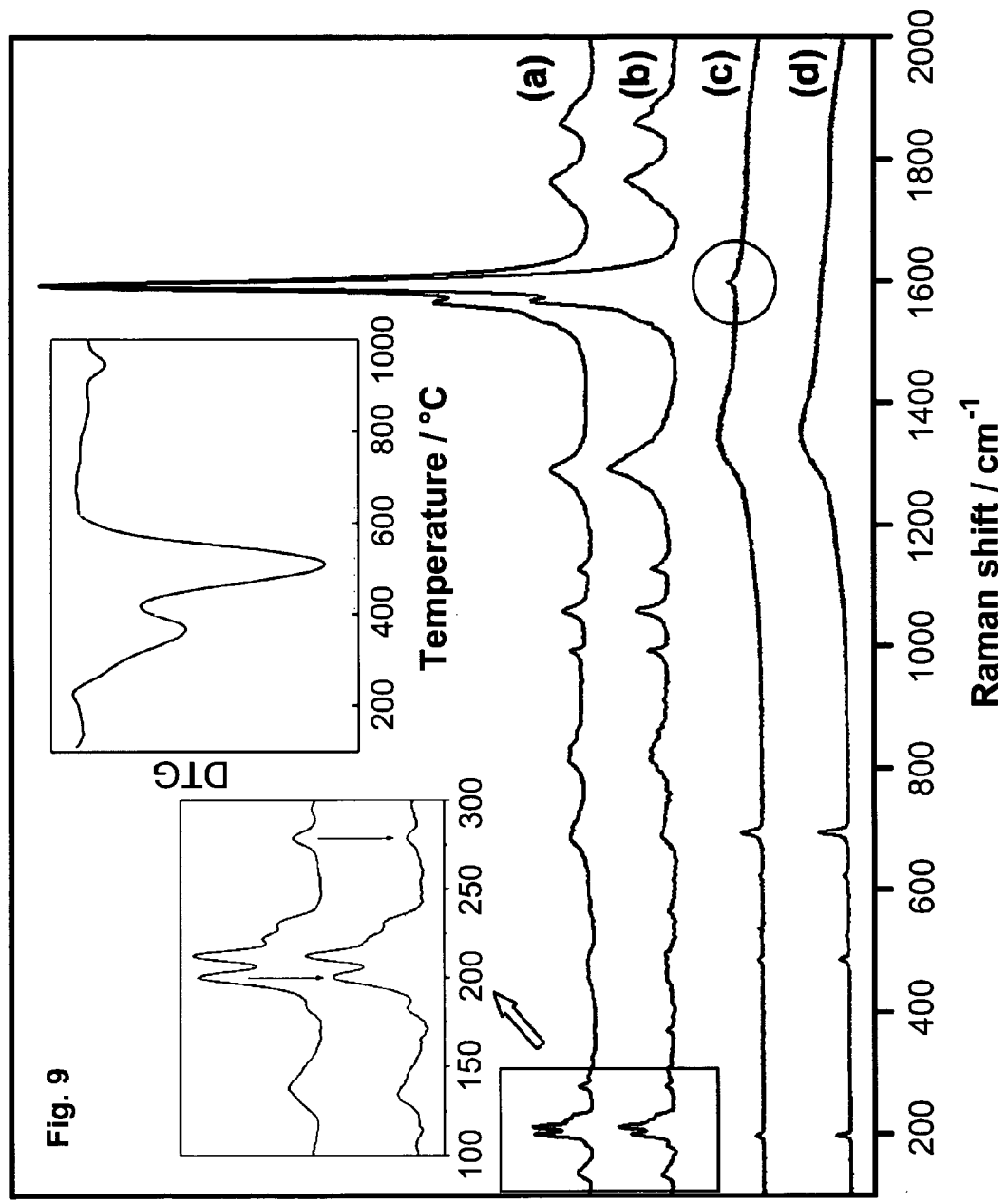
FIG. 9 depicts Raman spectra of SWCNT samples (prereduced Co-TUD-1 at 400° C.) under 785 nm laser: (a) as-synthesized SWCNT, (b) oxidized at 430° C., (c) oxidized at 620° C. and (d) calcined raw Co-TUD-1 catalyst.

Large cobalt clusters not only produce large diameters SWCNT but also lead to the formation of DWCNT, MWCNT and carbon impurities such as amorphous carbon and graphite. The SWCNT selectivity over other composites is an important evaluation factor regarding to a synthesis method. The composition of SWCNT samples can be assessed using Thermogravimetric Analysis (TGA) according to the different combustion temperatures of each carbon composite. FIG. 8 shows TGA results of SWCNT samples produced at different reduction temperatures, 500° C. (a) 450° C. (b) and 400° C. (c) using Co-TUD-1. In FIG. 8a, a dominant peak at 430° C. is attributed to the oxidation of SWCNT while a faint shoulder at 330° C. and a small peak at 900° C. can be assigned to amorphous carbon and graphite, respectively. The positive peak at 240° C. is the oxygen uptake by cobalt residue oxidation. Hence, it is clear that Co-TUD-1 reduced at 500° C. had a high selectivity towards SWCNT. However, once the reduction temperature decreases to 450° C. (FIG. 4b), the amorphous carbon peak at 340° C. became much stronger suggesting the presence of a certain portion of amorphous carbon in the sample. Meanwhile, a new peak at 520° C. appears and its assignment is difficult. Either SWCNT or MWCNT may show in the 500-600° C. region since many factor can shift their oxidation temperature: tube size, bundle size and metal-tube interaction (Lim, S, et al., J. Phys. Chem. C (2008), 112, 12442). To verify the origin of this 520° C. peak, Raman spectroscopy was conducted on a partially (430° C.) and a fully (620° C.) combusted SWCNT sample (reduced at 400° C.) to compare the carbon composition loss shown in FIG. 9. By comparing the first two Raman spectra, it is observed that the second spectrum (FIG. 9b) is still highly intensified after the combustion at 430° C. and the RBM peaks are identical with the as-synthesized sample (FIG. 9a). The insert (Left) shows the zoomed RBM peaks and two peaks at 200 and 278 cm$^{-1}$ shrink indicating a small portion of SWCNT has been oxidized. Furthermore, after combustion at 620° C., only a small G band at 1597 cm$^{-1}$ can be observed and it is originated from the graphite residue. The other profiles are identical with the raw calcined Co-TUD-1 catalyst (FIG. 9d) and are clearly not from carbon. Overall, it is concluded that the peak at 520° C., appearing in FIG. 8b and FIG. 8c, is from SWCNT oxidation as well, and the samples grown using Co-TUD-1 are highly enriched with SWCNT, although still combined with a small portion of amorphous carbon and graphite.

SUMMARY

In summary, cobalt incorporated TUD-1 having large surface area and well defined pore structure was synthesized in the above Examples. This mesoporous catalyst was applied to synthesize SWCNT using CVD and it is highly selective for SWCNT growth only mixed with a small amount of impurities including amorphous carbon and graphite. There was no evidence indicating any existence of MWCNT. What is more, the SWCNT (n,m) was narrowly distributed and dominated by (6,5) if the catalyst was prereduced at 500° C. By lowering the reduction temperature, the (n,m) distribution can be shifted to larger diameter range and (9,8) can be observed more intensified. Compared with currently widely used Co-MCM-41, Co-TUD-1 can produce equivalently high quality SWCNT but on the other hand, its synthesis simplicity and economy give it more credit over Co-MCM-41.

The listing or discussion of a previously published document in this specification should not necessarily be taken as an acknowledgement that the document is part of the state of the art or is common general knowledge. All documents listed are hereby incorporated herein by reference in their entirety for all purposes.

The invention illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by exemplary embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A method of forming single-walled carbon nanotubes, the method comprising contacting a gaseous carbon source with a mesoporous TUD-1 silicate at suitable conditions, wherein the mesoporous TUD-1 silicate comprises a catalytically effective metal for nanotube growth.

2. The method of claim 1, wherein the catalytically effective metal comprises a metal of groups 3-13 of the Periodic Table of the Elements.

3. The method of claim 1, wherein the method comprises carrying out chemical vapour deposition.

4. The method of claim 1, wherein the metal of groups 3-13 of the Periodic Table of the Elements is at least one of cobalt, nickel and iron.

5. The method of claim 1, wherein the carbon source is selected from the group consisting of CO, methane, methanol, ethanol and acetylene.

6. The method of claim 1, wherein the gaseous carbon source is contacted with the mesoporous TUD-1 silicate at a pressure in the range from 1 to about 10 atm.

7. The method of claim 6, wherein the pressure is 6 atm.

8. The method of claim 1, wherein the mesoporous TUD-1 silicate is obtained by reduction of a TUD-1 source silicate, wherein the TUD-1 source silicate is a mesoporous TUD-1 silicate comprising a metal or a metal oxide of groups 3-13 of the Periodic Table of the Elements.

9. The method of claim 8, wherein the reduction of the TUD-1 source silicate is carried out at elevated temperature.

10. The method of claim 8, wherein the reduction of the TUD-1 source silicate is carried out by exposure to $H_2$.

11. The method of claim 9, wherein the source TUD-1 silicate is reduced at a temperature at 450° C. or higher.

12. The method of claim 9, wherein the mesoporous TUD-1 silicate is reduced at a temperature up to 1000° C.

13. The method of claim 9, wherein the mesoporous TUD-1 silicate is reduced at a temperature in the range from about 500° C. to about 850° C.

14. The method of claim 1, wherein at least 50% of the single-walled carbon nanotubes formed have one of the chiral indices selected from the group consisting of (6,5), (9,8), (7,6), (8,4) and (7,6).

* * * * *